United States Patent [19]

Maury et al.

[11] Patent Number: 4,633,343
[45] Date of Patent: Dec. 30, 1986

[54] METHOD OF AND APPARATUS FOR WRITING DATA ON A RECORDING MEDIUM AND THE MEDIUM SO PRODUCED

[75] Inventors: Christian Maury, Voisins le Bx; Jean Lequien, Hargeville; Denis Pinson, Goupillieres, all of France

[73] Assignee: Cii Honeywell Bull, France

[21] Appl. No.: 688,442

[22] Filed: Dec. 31, 1984

[30] Foreign Application Priority Data

Dec. 30, 1983 [FR] France ................ 83 21064

[51] Int. Cl.[4] .................. G11B 5/00; G11B 20/20; G11B 21/08
[52] U.S. Cl. .................................... 360/76; 360/78
[58] Field of Search ............... 360/75, 77, 78, 76

[56] References Cited

U.S. PATENT DOCUMENTS

| | | | |
|---|---|---|---|
| 4,151,571 | 4/1979 | Cardot et al. | 360/49 X |
| 4,317,144 | 2/1982 | DeNier et al. | 360/76 |
| 4,352,131 | 9/1982 | Herk et al. | 360/78 |
| 4,354,208 | 10/1982 | Maury | 360/40 |
| 4,367,505 | 1/1983 | Stroppsta et al. | 360/66 |
| 4,379,256 | 4/1983 | Maury | 318/561 |
| 4,392,164 | 7/1983 | Lequien | 360/77 |
| 4,400,746 | 8/1985 | Lequien | 360/77 |

FOREIGN PATENT DOCUMENTS

| | | | |
|---|---|---|---|
| 53-70809 | 6/1978 | Japan | 360/75 |
| 57-105805 | 7/1982 | Japan | 360/76 |
| 58-108065 | 6/1983 | Japan | 360/75 |

OTHER PUBLICATIONS

IBM-TDB-Read/Write Magnetic Adjustment Method, vol. 20, No. 5, Oct. 1977, by Hart et al.
IBM-TDB Skew Detector and Detector and Corrector for a Disk, Drum or Tape Storage, Grimes, vol. 18, No. 1, Jun. '75.

*Primary Examiner*—Vincent P. Canney
*Attorney, Agent, or Firm*—Lowe, Price, LeBlanc, Becker & Shur

[57] ABSTRACT

Data are written as transitions on plural tracks of a magnetic disc by a transducer which travels along an arcuate curve formed by an arm turning about an axis beyond the disc periphery. Transition positions are defined by the phase thereof relative to that of a reference indicator on a track of the disc. To align the transitions along a predetermined arcuate curve, a reference transition having a reference phase is written onto a given track. Other transitions of the second curve are written with a phase shift relative to the reference phase.

20 Claims, 17 Drawing Figures

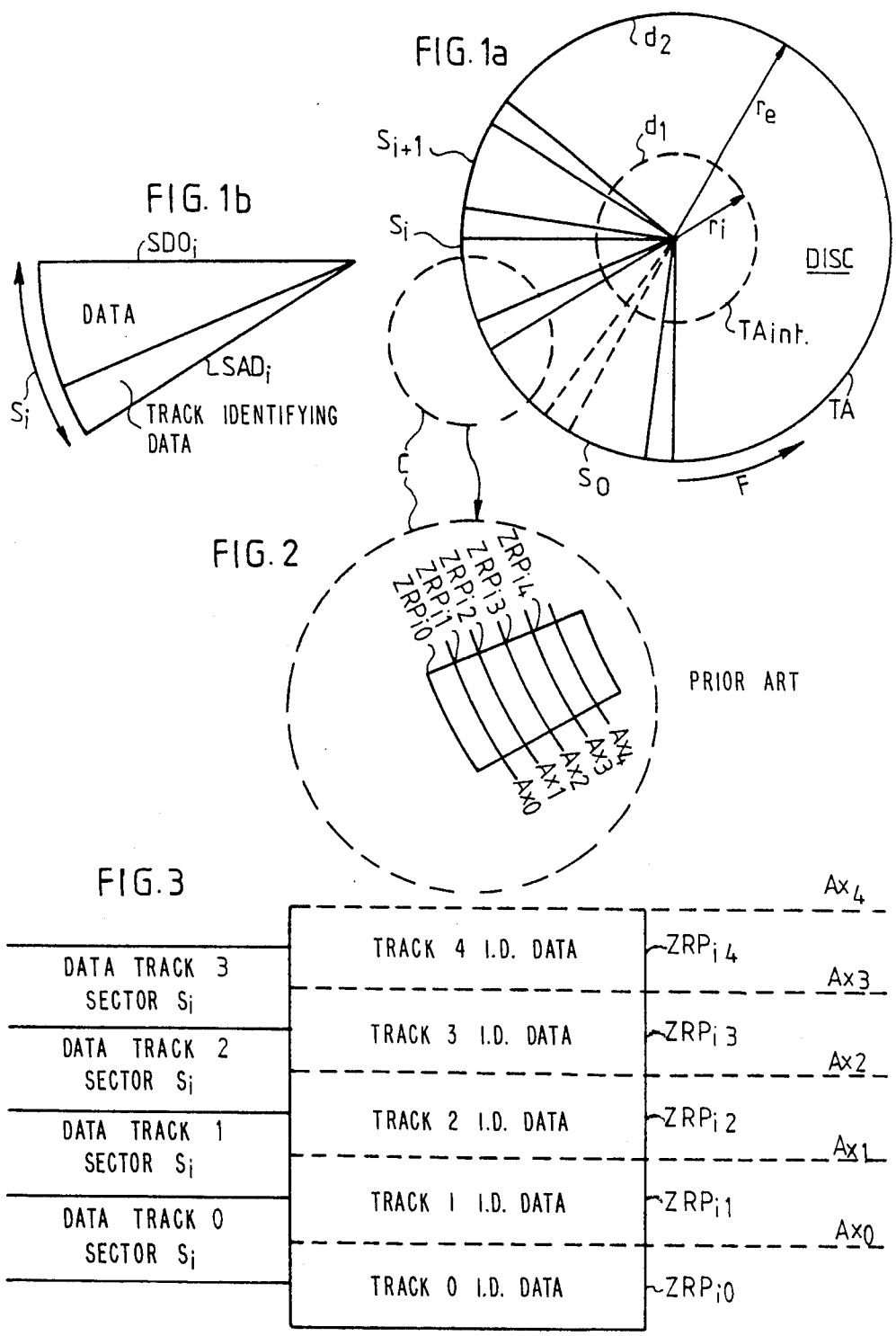

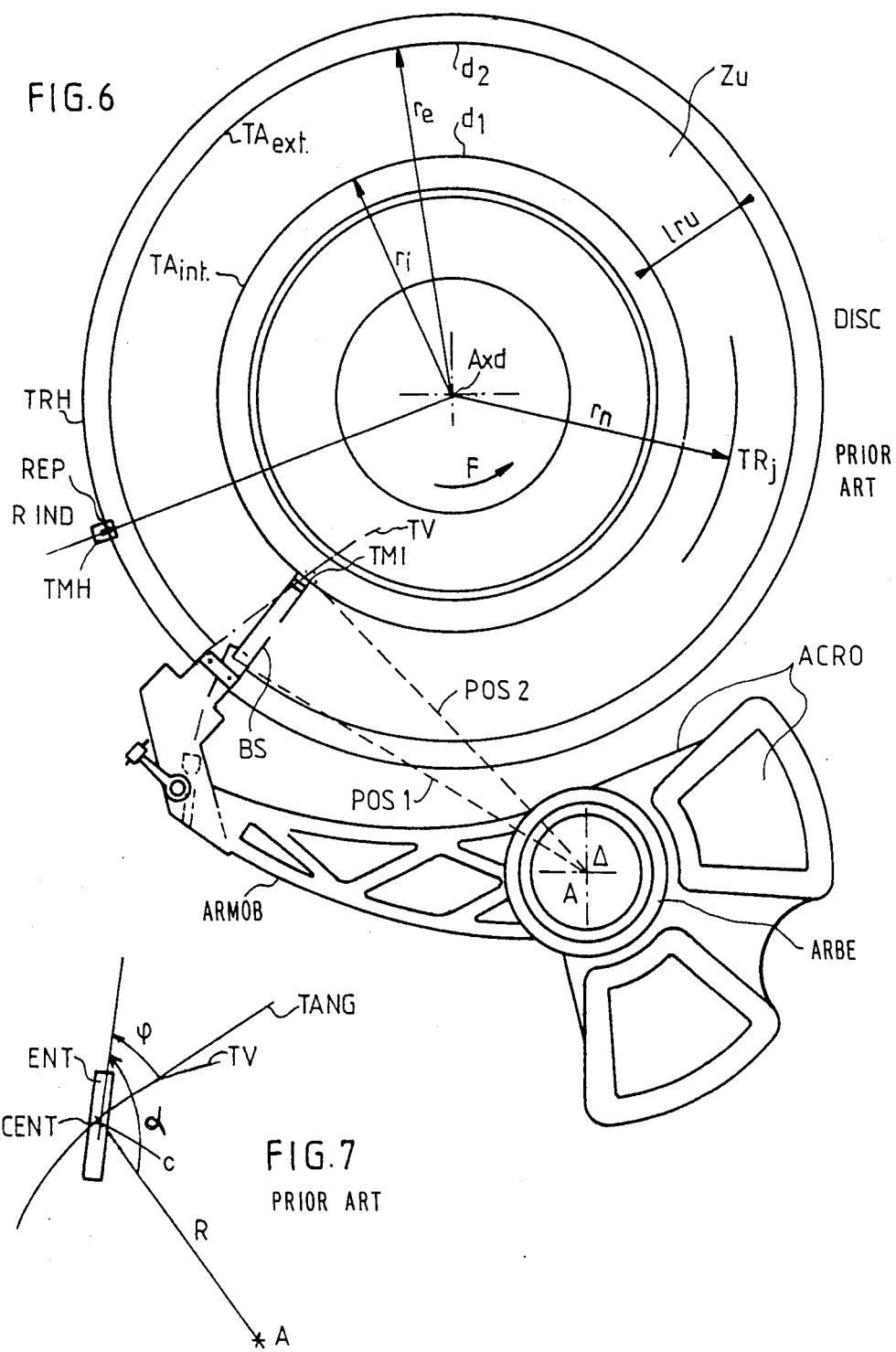

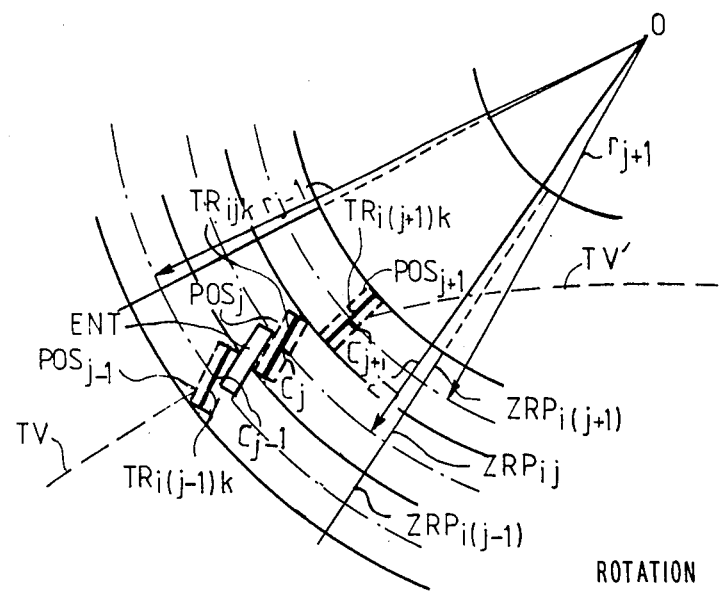
FIG. 8
PRIOR ART
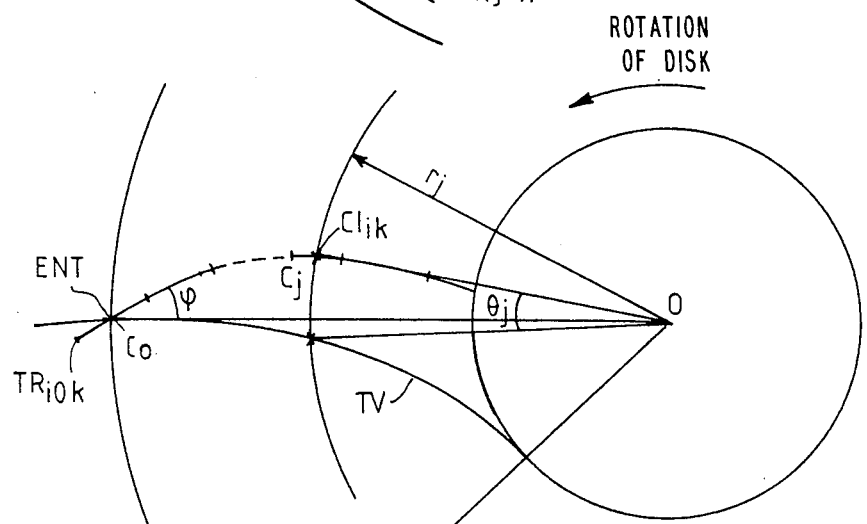
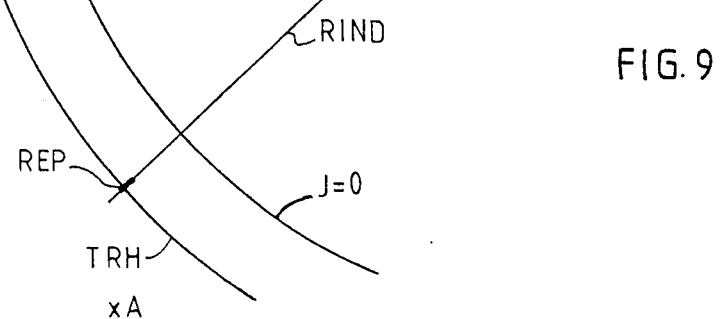
FIG. 9

METHOD OF AND APPARATUS FOR WRITING DATA ON A RECORDING MEDIUM AND THE MEDIUM SO PRODUCED

FIELD OF INVENTION

The present invention relates generally to a method of writing data on a recording medium and to the recording medium thereby produced, and more particularly to a method wherein a rotary actuator positions a transducer relative to plural curved tracks, one of which includes a reference phase and the remainder of which include data representing state transitions having phases relative to the reference phase that are a function of geometric parameters of the rotary actuator, the transducer and the tracks relative to a carrying medium for the tracks, and to a recording medium produced by writing information with such a method.

BACKGROUND ART

Disc memories, of the type widely used in data processing systems, carry encoded data on circular concentric tracks that can be situated on both faces of a disc. Typically, the recording tracks have a width of no more than a few dozen microns. The discs are driven at constant rotational velocity by a rotary output shaft of an electric motor. Data are written into, i.e., recorded, and read from magnetic discs by transducers, one or more of which is normally associated with one face of the disc. The disc passes in front of the transducer or transducers, causing the transducers to apply state transitions to the tracks or to enable the transducers to read state transitions from the tracks. In magnetic discs, the transitions are state changes of magnetic flux recorded on the disc by the transducers or read from the disc by the transducers. Most commonly used transducers are magnetic transducers generally comprising a magnetic circuit coupled to a winding and including an air gap. In the present specification and claims, the air gap is defined as part of a transducing means of the transducer. The air gap is symmetrical, with the center of symmetry being referred to as the center of the air gap and the center of the transducing means. Typically the air gap has a substantially rectangular shape, with a length much greater than the width thereof. The air gap longitudinal axis of symmetry is referred to in the present specification and claims as the "direction of the air gap."

To write or read data between the tracks on one face of the disc with the transducers, it is necessary to move the transducer or transducers associated with a particular disc face parallel to the face. To this end, the transducer is an integral part of a supporting arm held by a positioning system or actuator. In the prior art, linear actuators are commonly employed to translate the transducer along a radius of the disc face with which a particular transducer is associated. The transducer air gap subsists along the radius over which the transducer moves. In one type of magnetic disc, a data sequence is represented by a succession of small magnetic areas distributed along the length of each track. The magnetic areas have either positive or negative magnetic flux fields of equal amplitude, or no magnetic flux field. The direction of the flux field is either parallel or perpendicular to the disc surface. The number of elementary positive magnetic flux areas is equal to the number of elementary negative magnetic flux areas.

A physical boundary between two adjacent elementary magnetic flux areas having opposite polarities in the same track defines a magnetic transition. Thus, a magnetic transition is the physical zone where a change occurs in the physical state between two elementary magnetic flux areas; the physical state is defined by the direction of the magnetic flux transition, i.e., from positive to negative or from negative to positive. More generally, for any type of data recording system, such as capacitive, optical, et cetera, a transition is defined as a physical zone where a change occurs in a physical state between two adjacent elementary areas of a track.

In magnetic recording, a data bit is defined by at least one magnetic transition. The value of a data bit depends on the type of transition, i.e., from positive to negative or negative to positive. Alternatively, the magnetic transition can be represented by the presence or absence of a transition or on the type of association of the transition with another transition or transitions; one particular example of the latter transition type is data bits formed by an association of two magnetic transitions of opposite polarity, as disclosed in French Pat. No. 2,439,435, commonly owned with the present invention, entitled "Method of Writing Information On A Magnetic Recording Medium", which is the equivalent of U.S. Pat. No. 4,354,208. In the system disclosed in the '435 French patent, the value of a data bit is a function of the presence or absence of a double magnetic transition.

Currently available magnetic discs and transducers enable the packing density of the disc, in both the radial and circumferential directions, to be extremely large. The radial density of a disc is the number of tracks per unit length measured along a radius of the disc. The longitudinal density of a track is the number of data bits per unit length of the track, measured along the track circumference. By providing extremely high packing densities, the same amount of data can be stored on a smaller number of discs and the size of the discs can be decreased.

In the discs disclosed in French Pat. No. 2,439,435, the data are distributed in adjacent circular sectors each having the same area. One face of the disc is generally divided into several tens of sectors, each of which is divided into two unequal areas. The larger area contains data to be processed by a data processing system by which the disc memory is a part. The smaller area of each sector contains track identifying information used by a device for positioning the magnetic transducers facing the disc tracks.

The smaller area of each sector is divided into several reference zones. Each track is associated with two adjacent reference zones. The boundary between two reference zones coincides with the circumference of a circle located in the center of a track associated with the two zones. Thereby, when a magnetic transducer reads data from a given track, it reads the data of two adjacent reference zones because the transducer is astride the adjacent reference zones. Preferably, the transducer is perfectly centered on the boundary between the two reference zones. Each reference zone contains plural magnetic transitions, each occupying a specific, predetermined position and having a serial number within the zone.

To read or write data recorded on the magnetic tracks of a disc face in the larger, data area of each sector with the highest possible degree of accuracy, it is necessary for the transducer to be positioned relative to each track with the greatest possible accuracy. Hence, it is necessary to write the track identifying information into the smaller sectors with maximum precision, as is achieved by using a special formatter device. The track identifying information is initially written by the formatter into the disc for the entire lifespan of the disc, typically prior to the disc being sold or sent to a user.

Increasing the radial and longitudinal data densities contained on magnetic discs has enabled the size of the discs to be considerably reduced. Reducing the size of the discs has also resulted in a reduction in the size of memory units including the discs. This has been accompanied by the use of rotary actuators in the disc memory units because such actuators require less electric power than a linear actuator and because they require a smaller volume. A rotary actuator includes mobile structure which rotates about an axis parallel to the magnetic disc rotation axis; the axis of the mobile structure is located beyond the periphery of the disc. The rotary actuator carries a supporting arm for the data writing transducer in such a manner that the transducer moves in an arc from a track at the periphery of a disc toward a track at the disc center. Typically, the axes of rotation of the disc and actuator are spaced approximately 80 millimeters apart and the disc has a 65 millimeter radius. In such an instance, the transducer moves through an arc having a length of approximately 20 millimeters and a radius of approximately 60 millimeters relative to the actuator rotation axis.

Typically small disc memory units include a removable disc or two discs, only one of which is removable. The removable disc is located in a cartridge having a substantially rectangular window through which pass two platforms, each of which includes a transducer associated with a face of the disc which is located in the cartridge. The maximum dimensions of the window are on the order of 20 millimeters by 5 millimeters, to minimize air turbulence within the cartridge, as well as dust particle contamination. In the idle state, when the disc memory is not functioning, the transducers and a bearing platform for them are located outside of the cartridge. The transducers are activated to the read or write position within the cartridge by introducing the bearing platforms therefor from outside of the cartridge into the cartridge interior through the window. The width and height of each platform are respectively approximately 19 millimeters and 2 millimeters. When the transducer reads data from or writes data into the center most disc track, the platform has a length inside the cartridge on the order of 30 millimeters.

Under the conditions thus defined by the stated dimensions of the window, platform rotary actuator and the position of the actuator relative to the disc, it is impossible to position the transducer so that the direction of the air gap thereof is the same as a tangent to the path described by the transducer, or in such a way that the air gap direction subtends a zero angle with the tangent to the transducer path. Instead, the air gap direction forms an angle $\phi$ with the transducer path tangent; the transducer path is assimilated to the path described by the air gap center of symmetry. The angle $\phi$ has a value ranging from several degrees to a maximum of approximately 20 degrees.

The inability to position the transducers in such a way that the direction of the air gap thereof is the same as the tangent of the path described by the transducer causes the information to be read with a relatively low degree of accuracy from the reference zones in all sectors of the disc. Inaccuracies in reading the information from the reference zones may result in inaccurately determining the position of a transducer reading or writing data from and into the disc tracks, thereby producing errors in the data written into and read from the disc.

To appreciate the reason for the inaccuracy in reading the information from the reference zones, consider the situation of transitions written into the reference zones in accordance with the method described in the previously mentioned patent. The transitions written into the reference zones are identified relative to a permanent angular reference indicator carried by the disc. The reference angular. indicator enables the time origin, i.e., reference angular position, and therefore the phase origin of the disc to be accurately determined. Because the angular rotational velocity of the disc is maintained extremely constant, the phase of a point around the disc relative to the permanent angular reference indicator is a linear time function. In currently available disc memories and formatters, the angular reference indicator can be provided by a special indicator, either as a magnetic transition or by an optical transition formed by mechanical means. The special reference angular indicator is established at the periphery of the disc, on a special track, referred to as a clock track. The angular reference indicator is detected by a transducer which is different from the transducer used to detect data and track location information on the previously mentioned tracks. This special transducer is frequently called a clock transducer, which may be either a magnetic or opto electronic transducer.

During each disc revolution, the specific instant when the special transducer detects the transition in the clock track defines a time origin and therefore a phase origin. From the phase origin a succession of times $t_{00}$, $t_{01}$, $t_{02}$, et cetera is defined such that: $t_{01}=t_{00}+1/N$, $t_{02}=t_{01}+1/N$, et cetera, where $1/N$ is the period of one revolution of the disc and N is the number of disc revolutions per second. The intervals between $t_{00}$, $t_{01}$, $t_{02}$ et cetera define, for each revolution, the time and phase origins and the time sequences relative to the time and phase origins; this is because the phase is computed as a multiple of an integer to an accuracy of $2\pi$ radians, and the disc velocity is maintained absolutely constant. The specific position occupied by the disc radius which passes the special indicator at each of instances $t_{00}$, $t_{01}$, $t_{02}$ et cetera, thus is referred to as an angular reference indicator. The position of a given transition in a reference zone on a given track of a given sector is defined by the time separation between the time origin $t_{00}$, $t_{01}$ $t_{02}$ et cetera associated with the sector to the occurrence of the transition. The time separation depends on the zone where the transition is located and on the angular velocity of the disc as it passes in front of a write head. For each exact known period there corresponds an angular position of a radius passing through a transition to be written into the disc, relative to the angular reference indicator. This angular position is referred to as a transition phase. When all transitions of the same serial number from all of the reference zones of a particular sector are written by a transducer driven by a linear actuator, as described in the previously mentioned patent, all of the transitions have the same phase. This provides for the highest degree of accuracy in positioning the read-write transducer above the disc during use.

However, if the transitions of a reference zone of a magnetic disc are written with a transducer driven by a rotary actuator, as described supra, in such a manner that all transitions of the same serial number of the reference zones of one sector have the same phase, several adverse consequences occur. In particular, the transitions within the reference zone are shifted relative to each other, with the centers of the transitions being aligned along an arc similar to that described by the air gap center. Each of the transitions forms an angle $\phi$ with the tangent to the arc so that the adjacent transitions are substantially parallel to each other. This parallelism causes the information to be read from the reference zones with a relatively low accuracy, with the adverse effects previously mentioned.

THE INVENTION

The present invention obviates these disadvantages of the prior art by aligning transitions of the same serial number in reference zones of one sector along a curve obtained by a write process wherein a reference transition with a reference phase is written into a given reference zone, preferably situated at the disc periphery. Each of the transitions of the same serial number is written along a curve so the transition is phase shifted relative to the reference transition phase. The phase shift of the serial number is a function of the radius of the reference zone where the transition is written and geometric parameters defining a write system formed by the actuator, write transducer and the disc. In other words, the phase of each of the transitions depends on the radius of the transducer path (the distance from a transducer pivot point outside of the disc perimeter to the track where the transducer is located), the angle $\phi$ between the tangent of a path the transducer takes across the medium and a center line of the transducers present location, the distance between concentric tracks on the medium, and the radius from the disc center of the zone where the reference transition is located.

The present invention is also directed to a disc carrying a recording medium produced by the method. In particular, such a recording medium includes plural tracks on which data are written and defined by transitions between two physical states of adjacent elementary areas. The recording medium includes a reference indicator relative to each of the transitions, as defined by a predetermined phase or angular position. The data transitions are located with respect to a reference angular position or phase at a position which is a function of the distance from a pivot point outside of the perimeter of the medium of an arm carrying a transducer which writes the transitions onto the medium, the angle $\phi$ between the tangent of a path the transducer takes across the medium and a center line of the transducer present location, the distance between adjacent tracks on the medium, and the radius from the disc center of the zone where the reference transition is located.

The invention is also directed to the combination of such a disc and a transducer for reading and writing the transitions, wherein the transducer is mounted on an arm that turns about an axis outside the disc perimeter.

The method, disc and combination of the present invention enable the same advantages to be obtained as are obtained by writing transitions with constant phase using transducers which are driven by a linear actuator. In other words, the same high degree of accuracy in reading track identifying data and positioning transducers relative to the tracks is attained with the present invention as is attained with the prior art using linear actuators. Signals generated by reading the information transitions are used according to the same processes and are read with the same functional circuits as described in French applications and Pat. Nos. 79 31 080, 79 28 421 (corresponding with U.S. Pat. No. 4,400,746), French application No. 79 23 580, respectively filed in France on Dec. 19, 1979, Nov. 19, 1979, Sept. 21, 1979, and Sept. 21, 1979, and commonly owned with the present invention. The processes and circuits disclosed in these applications and patents are designed to use the signals written in the reference zones according to French Pat. No. 2,439,435.

In contrast to the prior art, transitions of the same serial number in reference zones of one sector do not have the same phase. Instead, the phase of transitions having the same serial number in a particular reference zone of a single sector have a phase dependent on the position occupied by the transition relative to the disc center and which is a function of geometric parameters of a system used to write the transitions into the disc medium.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWING

FIG. 1, including FIGS. 1a and 1b, is an illustration of a prior art magnetic disc and the manner in which data are distributed on one face thereof;

FIG. 2 is an enlarged view of a portion of the disc illustrated in FIG. 1a;

FIG. 3 is a schematic illustration of the manner in which reference zones are positioned relative to the tracks containing recorded data in the disc of FIGS. 1 and 2;

FIG. 6 is a top view of a prior art magnetic disc and a rotary actuator for holding a magnetic transducer for writing data on a disc, in accordance with the prior art;

FIG. 7 is a schematic view of the prior art transducer of FIG. 6, wherein the transducer air gap is indicated as forming an angle $\phi$ with respect to the tangent of the magnetic transducer path above the disc;

FIG. 8 is a schematic illustration of the manner in which transitions having the same serial number are written into reference zones of one sector by the prior art write transducer illustrated in FIG. 6, and how the transitions having constant phase are positioned relative to each other on the disc;

FIG. 9 is a schematic illustration of the positions of transitions having the same serial number within a reference zone on a magnetic disc and is useful for indicating how such transitions are written into the disc in accordance with the present invention;

FIG. 11, including

DETAILED DESCRIPTION OF THE DRAWINGS

To provide a better understanding of how data are written into reference zones of a recording medium in accordance with the invention, consideration is given to the prior art of FIGS. 1-5 wherein it is indicated how data are distributed on the surface of a magnetic disc recording medium. In addition, consideration is given to FIGS. 6-8 wherein the method of writing data into the reference zones shown in FIGS. 1-5 by a rotary actuator is illustrated. The description of FIGS. 1-8 includes specific mentions of the disadvantages of the prior art method of writing data in such discs and of the disc per se.

Magnetic disc DISC, FIG. 1a, has a useful recording area bounding by inner and outer circles $d_1$ and $d_2$, respectively. On disc DISC are defined p equal and adjacent circular sectors $S_0, \ldots S_i, S_{i+1}$, etc. When data are written into and read from disc DISC the disc rotates in a counterclockwise direction, as indicated by arrow F.

As seen in FIG. 1b, each sector $S_i$ is divided into a relatively large data part $SDO_i$ and a relatively small part $SAD_i$. In part $SDO_i$ are recorded data to be processed by a data processing system of which the disc memory including disc DISC is a part; in part $SAD_i$ are recorded track locating data (the addresses of the tracks and data for controlling the position of a magnetic head relative to the tracks).

The useful recording area bounded by the circles having diameters $d_1$ and $d_2$ have radii of $r_i$ and $r_e$ respectively. Circles $d_1$ and $d_2$ respectively define inner and outer recording tracks $TA_{int}$ and $TA_{ext}$.

As illustrated by the enlarged views of part $SAD_i$ of sector $S_i$ in FIGS. 2 and 3, each part of $SAD_i$ is divided into several reference zones $ZRP_{i0}, ZRP_{i1} \ldots ZRP_{i4}$. Generalizing, sector $SAD_i$ is divided into $NP' = (NP+1)$ reference zones which are represented as $ZRP_{10} \ldots ZRP_{ij} \ldots ZRP_{i(NP)}$, where NP is the total number of recording tracks on disc DISC. For convenience, the reference zones $ZRP_{i0}$–$ZRP_{i4}$ are represented by rectangles, instead of sectors of a circle, in FIG. 3.

The boundaries between adjacent reference zones $ZRP_{ij}$ are defined by circles $Ax_j$ defining the center of recording tracks of magnetic disc DISC. In each sector $S_i$, reference zones $ZRP_{ij}$ and $ZRP_{i(j+1)}$ are associated with a track having serial number j on circle $Ax_j$. Reference zones $ZRP_{i0}$ and $ZRP_{i1}$ are associated with a track having serial number 0, while reference zones $ZRP_{i1}$ and $ZRP_{i2}$ are associated with a track having serial number 1, etc.

Figure 4:
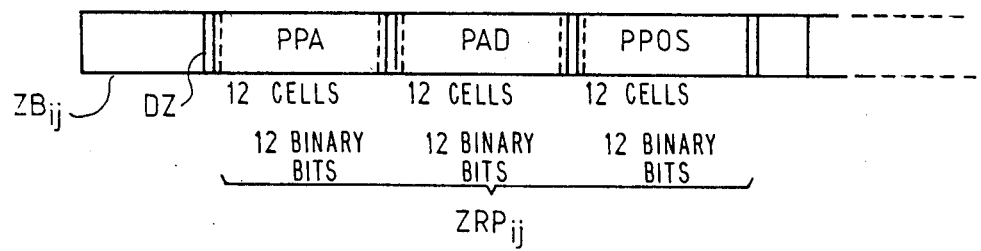
FIG. 4 is a schematic illustration of the manner in which data are distributed in a magnetic disc reference zone according to the prior art.

In FIG. 4 is more precisely illustrated how data contained in each reference zone $ZRP_{ij}$ are distributed in the reference zone in accordance with the previously mentioned French Pat. No. 2439435. Reference zone $ZRP_{ij}$ is preceded by a so-called white zone $ZB_{ij}$ having a uniform magnetic induction which is generally 0. White zone $ZB_{ij}$ allows the beginning of zone DZ, having a special magnetic transition, to be identified more readily. Reference $ZRP_{ij}$ includes three parts PPA, PAD and PPOS, each containing twelve data bits in a data cell. The twelve data bits of part PPA enable signals to be generated by read/write circuits of a disc memory containing disc DISC. The signals derived in response to part PPA control the gain of amplifiers in the read/write circuits so that data read from parts PAD and PPOS of reference zone $ZRP_{ij}$ are read with maximum accuracy, as described in French Application No. 79-31080.

The twelve data bits in part PAD define a track address; the address is the encoded expression of serial number j of the track having serial number j. The twelve data bits of part PPOS contain data for fine positioning, to provide perfect centering of a read transducer associated with disc DISC so that the transducer is exactly above the track of serial number j which the transducer faces. This enables the data to be read most accurately by the transducer.

Preferably each data bit includes a double magnetic transition, referred to as a "dibit". Each dibit includes two magnetic transitions of different types. The presence and absence of a dibit at a particular location is respectfully associated with first and second values of a data bit. Thus, each reference zone $ZRP_{ij}$ includes twice as many magnetic transitions as there are data bits. Each reference zone $ZRP_{ij}$ includes a maximum of n magnetic transitions $TR_{ij1}$–$TR_{ijn}$, wherein each transition is designated by the general term $TR_{ijk}$, where k is selectively each of the values from 1 to n, as illustrated in FIG. 5.

Figure 5:
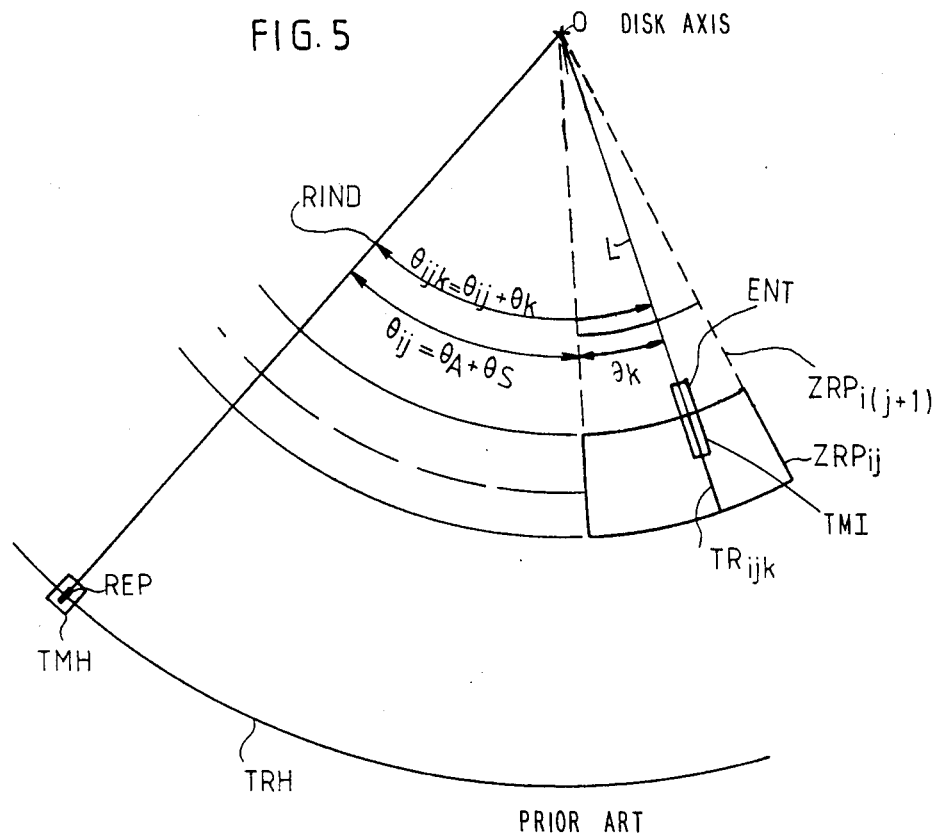
FIG. 5 is a schematic view of how a magnetic transition of a reference zone is identified relative to an angular reference indicator in the prior art.

As illustrated in FIG. 5, magnetic transducer TMI reads data from and writes data into reference zones astride the reference zones, i.e., transducer TMI is centered on a physical boundary between two adjacent reference zones $ZRP_{ij}$ and $ZRP_{i(j+1)}$. In the situation illustrated in FIG. 5, transducer TMI reads data contained in the track having serial number j and has an air gap ENT having a center CENT, as illustrated in FIG. 7.

The reference zones of $ZRP_{ij}$ of disc DISC have a common angular reference indicator defined by radius RIND; the magnetic transitions of the reference zones are identified relative to the angular reference indicator at radius RIND. Radius RIND passes through a special indicator REP located on clock track TRH on the periphery of disc DISC. Special indicator REP is read by fixed clock transducer TMH which is always above clock track TRH.

Each reference zone $ZRP_{ij}$ is identified relative to angular reference indicator RIND by the phase, i.e., angular position, of the reference zone, $\theta_{ij} = \theta A + \theta S$, where $\theta A$ is an arbitrary constant defined for each disc memory or for each formatter of a disc memory and $\theta S$ is the phase of reference zone $ZRP_{ij}$. If the angular reference indicator RIND is located in the sector $S_0$ at the beginning of zone $ZRP_{0j}$, the phase of reference zone $ZRP_{ij}$ is $2\pi i/p+1$, where p+1 is the number of sectors, whereby $2\pi/p+1$ is the angular distance between adjacent sectors. Thus, for example, if there are 33 sectors, phase $\theta S$ of sector $S_i$ containing reference zone $ZRP_{ij}$ is $2\pi/33$. The location of phase $\theta_{ijk}$ of transition $TR_{ijk}$ of each transition of zone $ZRP_{ij}$ is determined by adding phase $\theta_{ij}$ of zone $ZRP_{ij}$ to phase $\theta_k$ for each transition; the value of $\theta_k$ is a function of the transition position within the zone. The value of $\theta_{ijk}$ is therefore $\theta_{ij}+\theta_k$. Consequently, the position of each transition is defined by the phase $\theta_{ijk}$ of the transition. Associated with the phase $\theta_{ijk}$ is a distance $D_{ijk}$, measured along the circumference of radius $r_j$ of reference zone $ZRP_{ij}$. Associated with each distance $D_{ijk}$ is a travel time $t_{ijk}$ between the instant when angular indicator RIND moves to a position facing clock transducer TMH and the instant when transducer TMI reads or writes the transition $TRI_{ijk}$ from or into disc DISC. Thus, from the moment when phase $\theta_{ijk}$ for transition $TR_{ijk}$ is known, the transition $TR_{ijk}$ may easily be read from or written into disc DISC using read/write circuits included in the disc memory containing disc DISC.

Transitions having the same serial number of all reference zones in one sector $S_i$ all have the same phase $\theta_{ijk}$, if such transitions are present. As indicated in the previously cited French applications Nos. 79-31080, 79-28421 and 79-23580 and French Pat. No. 2,466,078, greater accuracy is provided in determining the position of the transducer above the disc tracks by arranging all transitions in the reference zones of a single sector so they have the same phase.

Reference is now made to FIG. 6, a plan view of a rotary actuator ACRO and magnetic disc DISC positioned in a typical prior art magnetic disc formatter. Disc DISC is similar to the disc illustrated in FIGS. 1–5 and therefore includes a useful zone $Z_u$ having a width $l_{ru}=r_e-r_i$. Disc DISC rotates in the counterclockwise direction, as indicated by arrow F, around rotation axis Axd. Useful zone Zu includes several hundred tracks, typically between 600 to 1,000 tracks. Useful zone Zu has a width $l_{ru}$ typically on the order of twenty milimeters. As described above, the trend is toward greater use of rotary actuators, such as actuator ACRO, for moving magnetic disc read/write tansducers. In the device schematically illustrated in FIG. 6, rotary actuator ACRO is of the type described in French Application No.82-04348, filed Mar. 15, 1982, and commonly owned with the present invention.

Rotary actuator ACRO includes a rotary drive shaft ARB which turns about axis Δ and carries light weight metal armature ARMOB. Fixedly mounted on armature ARMOB is supporting arm BS for write transducer TMI. The axis of rotation Δ for shaft ARBE is located beyond the periphery of disc DISC, whereby transducer TMI rotates about a pivot point outside of the perimeter of disc DISC. To write the track identifying data in all of the reference zones $ZRP_{ij}$ within useful zone ZU, it is necessary to rotate actuator ACRO from position $POS_1$ where transducer TMI is located above outer track $TA_{ext}$ to a position $POS_2$ where the transducer faces inner track $TA_{int}$. To move transducer TMI from position $POS_1$ to position $POS_2$, actuator ACRO turns about axis Δ, causing the transducer to describe an arc TV having a center A, coincident with axis Δ. Axes Δ and Axd lie in the same plane which is perpendicular to the plane of the face of disc DISC into which magnetic data are written and read by transducer TMI, containing air gap ENT which is also perpendicular to the plane of disc DISC.

As illustrated in FIG. 7, the longitudinal axis of air gap ENT in a plane parallel to the face of disc DISC subtends an angle $\phi$ with respect to the tangent TANG of the transducer path; the path of transducer TMI is defined by the movement of the center CENT of air gap ENT of the transducer. Assume that C is the point of path TV above which air gap center CENT is located. In such a situation, the angle $\alpha$ between the direction of air gap ENT and straight line AC can be represented as $\alpha=\phi+\pi/2$, where $\phi$ is a geometric parameter of the write system including rotary actuator ACRO, transducer TMI and disc DISC. Thus, the value $\phi$ is a predetermined parameter which is a function of the formatter and disc DISC.

The consequences of the relative positioning of transducer TMI, actuator ACRO and disc DISC in writing transitions having the same serial number in reference zones of one sector with the prior art technique can be realized by reference to FIG. 8. In FIG. 8, all transitions having the same serial number in reference zones of one sector are written with the same phase, $\theta_{ijk}$. In particular, a transition having serial number k in three adjacent reference zones $ZRP_{i(j-1)}$, $ZRP_{ij}$ and $ZRP_{i(j+1)}$ at different radii of sector $S_i$ is considered in FIG. 8. In the three adjacent, radially displaced reference zones $ZRP_{i(j-1)}$, $ZRP_{ij}$ and $ZRP_{i(j+1)}$ there are three transitions $TR_{i(j-1)k}$, $TR_{ijk}$, $TR_{i(+j+1)k}$, respectively having aligned centers $C_{j-1}$, $C_j$, $C_{j+1}$ lying on arc TV'; arc TV' lies on disc DISC. Centers $C_{j-1}$, $C_j$, $C_{j+1}$ are substantially parallel to each other, forming an angle with the tangent of arc TV at each of points $C_{j-1}$, $C_j$ and $C_{j+1}$ Arc TV' is identical to arc TV, defined by the center of air gap ENT of transducer TMI. Once during each revolution of disc DISC, arc TV' on disc DISC 7 coincides with the motion of the transducer, as defined by arc TV. FIG. 8 may be considered as a photograph of the disc and of arc TV as the instant where arc TV' concides with the position of arc TV.

When transition $TR_{i(j-1)k}$ is written into disc DISC by air gap ENT of transducer TMI, the air gap is above position $POS_{j-1}$ and is centered over reference zone $ZRP_{i(j-1)}$ at distance $r_{j-1}$ from disc center O. At this time, transition $TR_{i(j-1)k}$ lies along a straight line subtending an angle $\phi$ with the tangent to arc TV. Center $C_{j-1}$ of transition $TR_{i(j-1)k}$ is located on arc TV. The transition written through air gap ENT of transducer TMI at a given location has essentially the same dimension and direction as a center line of the air gap in a plane at right angles to the face of the disc DISC. The transition has a phase, i.e., angular position $\theta_{ijk}$ and subtends an angle $\phi$ with the tangent of arc TV at center point $C_{j-1}$. After transition $TR_{i(j-1)k}$ has been written into disc DISC transducer TMI is moved so it occupies the position $POS_j$, so the transducer is centered over reference zone $ZRP_{ij}$ at distance $r_j$ from disc center O; air gap ENT is represented by a dashed line in FIG. 8.

After disc DISC has completed one revolution after transition $TR_{i(j-1)k}$ has been written, the phase of the transition is equal to $\theta_{ijk}$ to an accuracy of $2\pi$, while center $C_{j-1}$ of the transition lies on curve TV. At that instant, transition $TR_{ijk}$ is written, with center $C_j$ of transition $TR_{ijk}$ positioned on arc TV so that it forms an angle $\phi$ with the tangent of path TV' for the movement of the transducer relative to the disc. By applying the same reasoning for all of the transitions, it is apparent that path TV' is identical to curve TV once during each revolution of disc DISC.

To read the transitions written by transducer TMI along arc TV, the air gap ENT of transducer TMI is positioned so the air gap faces reference zones $ZRP_{i(j-1)}$, $ZRP_{ij}$ and $ZRP_{i(j+1)}$ and is astride a pair of adjacent reference zones, for example reference zones $ZRP_{ij}$ and $ZRP_{i(j-1)}$; the position of air gap ENT during the reading of magnetic transitions in reference zones $ZRP_{i(j-1)}$, $ZRP_{ij}$ is represented by solid lines in FIG. 8. Thus, air gap ENT is displaced by approximately a half radius of the reference zone relative to disc center O, so that the air gap is responsive only to a part of transitions $TR_{i(j-1)k}$ and $TR_{ijk}$. Obviously, this is detrimental to the accuracy with which the data can be read and adversely affects the accuracy with which the air gap ENT can be positioned relative to the data tracks.

The present invention obviates the above-noted disadvantages by aligning transitions $TR_{ijk}$ of the same serial number k of reference zones of a sector Si along an arcuate curve $CI_{ik}$. The position of curve $CI_{ik}$ is illustrated in FIGS. 9–12 which also indicate the manner in which the transitions are written along the curve.

Initially a reference transition is defined and written by passing magnetic flux through air gap ENT in the reference zone located at the periphery of the useful zone $Z_u$, positioned at a distance $r_e$ from disc center O. The first transition $TR_{iok}$ written into the outermost reference zone at the periphery of zone $Z_u$ has a center $C_0$; the distance, in accordance with geometric notation, from center $C_0$ to disc center O is O $C_o=r_e$. The first transition $TR_{iok}$ has a phase referred to as reference phase $(\theta_{ijk})$; reference phase $\theta_{ijk}$ is defined in the same manner as the reference phase is defined in FIG. 5. In addition, the disc of FIG. 9 includes an angular reference indicator RIND at position REP along clock track TRH, in the same manner as described in connection with FIGS. 5 and 6 for position REP.

Transition $TR_{iok}$ and radius RIND are shown in FIG. 9 at the instant when the center $C_o$ of transition $TR_{iok}$ coincides with path TV of air gap ENT of write transducer TMI. The illustrated instant is either the exact moment when the transition $TR_{iok}$ is written by transducer TMI or one of the instant when transition $TR_{iok}$ reaches a position corresponding with transducer flight path TV. In effect, FIG. 9 is a photograph of the respective positions of disc DISC, transition $TR_{iok}$ and therefore of curve $CI_{ik}$ at the instant when center $C_o$ of transition $TR_{iok}$ corresponds with transducer flight path TV.

After transition $TR_{iok}$ has been written on curve $CI_{ik}$ on the outermost track J=0 of disc DISC, the other transitions $TR_{ijk}$ along curve $CI_{ik}$ are written sequentially. The other transitions $TR_{ijk}$ along curve $CI_{ik}$ are written in such a way that the phases of transitions $TR_{ijk}$ are $\theta'_{j}=\theta_{ijk}+\theta_j$, where $\theta_{ijk}$ is the phase of the reference transition on track J=0 and $\theta_j$ is a phase shift of a particular transition $TR_{ijk}$ along curve $CI_{ik}$ relative to reference phase $\theta_{ijk}$. The phase $\theta_0$ of transition $TR_{iok}$ on track J=0 is such that $\theta_0$ equals 0.

According to the invention, the phase shift $\theta_j$ between transitions of the same serial number changes between adjacent radially displaced reference zones. The change in the phase shift $\theta_j$ from one transition of the same serial number between adjacent reference zones depends on the position occupied by the particular transition $TR_{ijk}$ on the disc, i.e., on the radius $r_j$ of reference zone $ZRP_{ij}$ containing the transition. In addition, the change in the value of $\theta_j$ between adjacent transitions of the same serial number between adjacent reference zones is a function of geometric parameters of the system for writing the reference phases into the disc. The system for writing the transitions into the disc includes the rotary actuator for positioning the transducer, the transducer itself and the disc. In particular, these geometric parameters are the distance D between disc center O and the rotation axis A of actuator ACRO, the radius R of path TV of transducer TMI, the outer radius $r_e$ where the track containing reference transition $TR_{iok}$ is located, and angle between the tangent of track TV and curve $CI_{ik}$ along which transitions $TR_{ijk}$ lie. More specifically, the change in phase shift between two adjacent transitions $TR_{i(j-1)k}$ and $TR_{ijk}$ is a function of $r_j$ and the previously mentioned geometric parameters. Thus, if the phase of transition $TR_{iok}$ is $\theta_{ijk}$, the phase of the transition $TR_{i1k}$ in the adjacent track is $\theta'_1=\theta_{ijk}+\Delta\theta_1$. The phase of transition $TR_{i2k}$ in the next adjacent track is $\theta'_2=\theta'_1+\Delta\theta_2$. The phase of the generalized transition $TR_{ijk}$ is $\theta'_j=\theta'_{j-1}+\Delta\theta_j$. Therefore, $$\theta_j = \overset{d}{\underset{1}{\Sigma}} \Delta\theta_j.$$

Figure 11A:
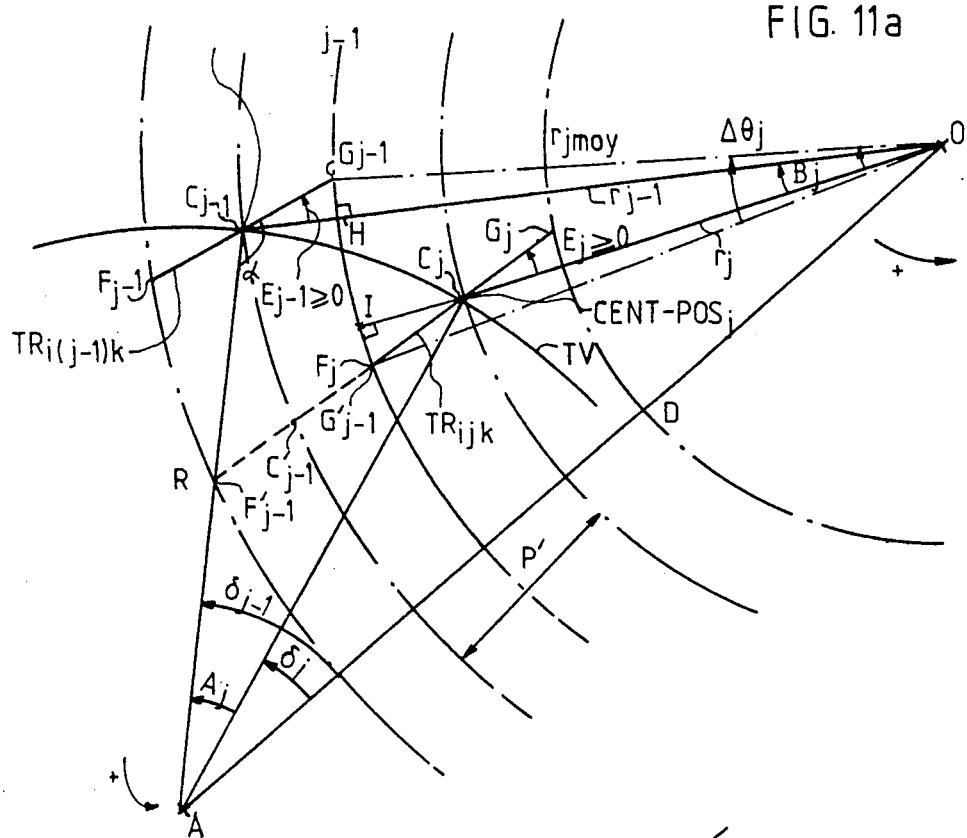
FIGS. 11a, 11b and 11c, is helpful to indicate how the phase shift $\theta_j$ is computed as the sum of elementary phase shifts between adjacent transitions.
Figure 11B:
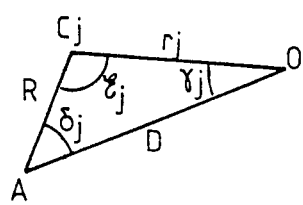
Figure 11C:
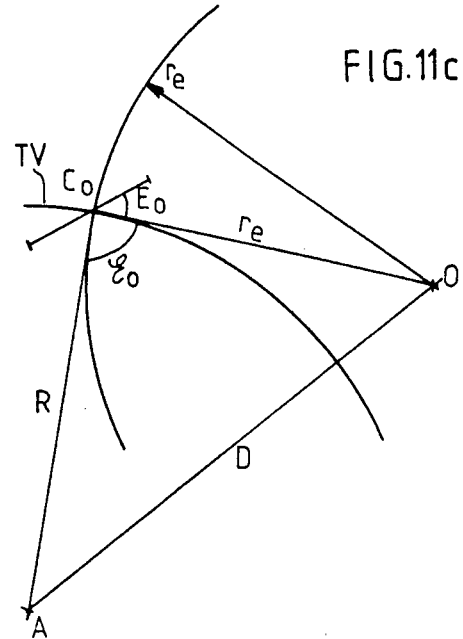
Figure 12:
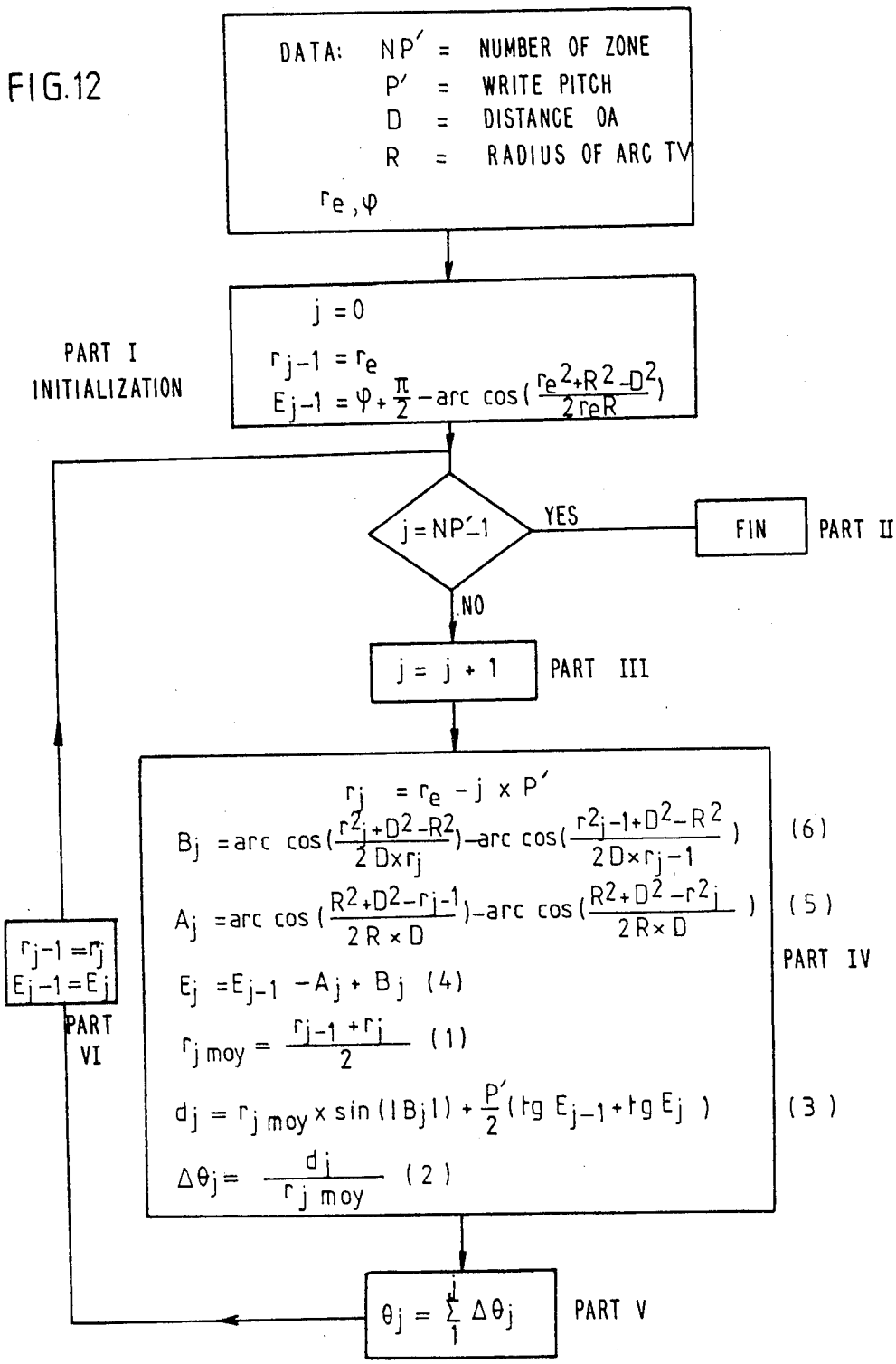
FIG. 12 is an algorithm indicating how the angle $\theta_j$ is computed for the situation illustrated in FIG. 11.

The detailed calculations for determining the value of $\Delta\theta_j$ are given infra in connection with FIGS. 11 and 12.

Figure 10:
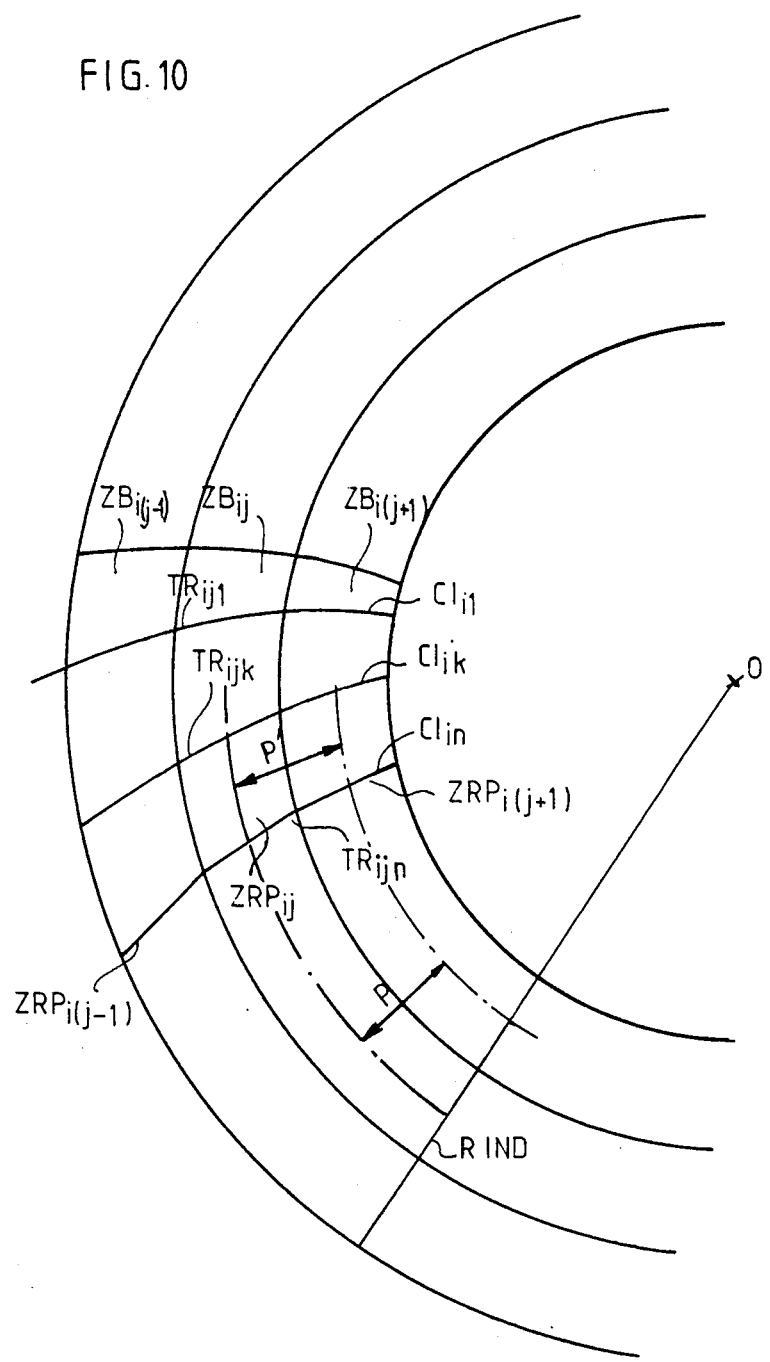
FIG. 10 is a schematic view of the manner in which transitions having the same serial number appear in three adjacent reference zones of one sector and is useful to indicate how such transitions are written into the three adjacent reference zones in accordance with the invention.

Reference is now made to FIG. 10 wherein several aligned transitions having the same serial number in adjacent reference zones $ZRP_{i(j-1)}$, $ZRP_{ij}$ and $ZRP_{i(j+1)}$ of the same sector $S_i$ are illustrated. In FIG. 10, three alignment curves corresponding with three transitions having serial numbers 1, k, n are illustrated, such that the transition of serial number 1 is the first transition of the reference zone and the transition of serial number n is the last transition of the three reference zones. The transitions of serial numbers 1, k and n lie along alignment curves $CI_{il}$, $CI_{ik}$ and $CI_{in}$, respectively. Each of the alignment curves $CI_{ik}$ includes a finite number of substantially straight line segments coincident with transitions $TR_{ijk}$, corresponding with the center lines of air gap ENT. The value of phase angle $\theta_j$ separating transitions of the same serial number in adjacent reference zones can best be determined from FIG. 11, wherein it is noted that $\theta_o$ equals 0 for the reference transition $TR_{iok}$. In FIG. 11, P' designates the writing pitch of transitions $TR_{ijk}$, wherein the transition pitch is defined as the distance between adjacent circles passing through the centers of the transitions. In the situation illustrated in FIG. 11, the circles of radii $r_{j-1}$ and $r_j$ pass through centers $C_{j-1}$ and $C_j$ of transitions $TR_{i(j-1)k}$ and $TR_{ijk}$. In FIGS. 10 and 11 P' is equal to the pitch P between adjacent ones of reference zones $ZRP_{ij}$, i.e., the distance between the center circles for the adjacent reference zones. The pitch P between adjacent reference zones $ZRP_{ij}$ is equal to the pitch of tracks on disc DISC. In addition, the length of each transition in a radial direction of disc DISC is assumed to be substantially equal to P'. In fact, however, the length of each transition is slightly less than P', to avoid write interference between transitions on adjacent tracks. The choices for the values of these pitches were made to clarify the description of the invention, particularly the method for calculating the phase angle $\theta_j$, described infra. As described infra, the transitions may be written with lower pitches P' than pitch P of the reference zones. For example, pitches P' may have a distance equal to a whole fraction of pitch P, i.e., P/m where m is a positive integer. For the case of P/m, each reference zone includes m abutting transitions. As described infra in connection with FIGS. 13 and 14, such a selection allows a more accurate definition of curves $CI_{ik}$.

Consideration is now given to the manner in which transitions are written in accordance with the present invention by reference to FIG. 11a. At the moment of writing transition $TR_{i(j-1)k}$, having a phase of $\theta'_{j-1} = \theta_{ijk} + \theta_{j-1}$, the center CENT of air gap ENT of write transducer TMI occupies position $POS_{j-1}$, as illustrated in FIG. 11a by the position of point CENT-$POS_{j-1}$ at the intersection of straight lines R and $r_{j-1}$ along arcuate line TV. When the center of the air gap is at the position ENT - $POS_{-1}$ the written transition center $C_{j-1}$ has a position coinciding with the center of air gap ENT and is positioned on path TV. Transition $TR_{i(j-1)k}$ at this time occupies the position along an approximate straight line defined by aligned points $F_{j-1}$, $C_{j-1}$ and $G_{j-1}$; points $F_{j-1}$ and $G_{j-1}$ are at the ends of the air gap respectively remote from and closest to disc center O. During the revolution of disc DISC following the instant when transition $TR_{i(j-1)k}$ is written, air gap ENT is moved in such a way that the center of the air gap occupies position $POS_j$, situated on radius $r_j$ from center O of disc DISC. When the revolution of disc DISC is complete, transition $TR_{i(j-1)k}$ returns to the straight line defined by the three aligned points $F_{j-1}$, $C_{j-1}$ and $G_{j-1}$.

To write transition $TR_{ijk}$ in such a way that adjacent transitions $TR_{i(j-1)k}$ and $TR_{ijk}$ are aligned, it is necessary to wait for the instant when transition $TR_{i(j-1)k}$ occupies the position indicated by the straight line defining aligned points $F'_{j-1}$, $C'_{j-1}$ and $G'_{j-1}$. Thus, transition $TR_{ijk}$ must be written with a phase shift $\Delta\theta_j$ relative to phase $\theta'_{j-1}$ so that the phase of transition $TR_{ijk}$ can be represented as: $\theta'_j = \theta'_j + \Delta\theta_j$, where $\Delta\theta_j$ is the angle between intersecting straight lines $OG'_{j-1}$ and $OG_{j-1}$, which in turn is equal to the intersection between the straight lines $OF_j$ and $OG_{j-1}$; the latter equality exists because of the coincidence of points $G'_{j-1}$ and $F_j$. Similarly, $\theta_j = \theta_{j-1} + \Delta\theta_j$. In the described embodiment $\Delta\theta_j$ is a finite, non-zero phase delay. The arc between points $F_j$ and $G_{j-1}$ has a small enough curvature to be assumed as a straight line segment. The angle $\alpha$ between line R, from the center of rotation A of actuator ACRO and the center $C_{j-1}$ of the air gap, can be represented by a pair of intersecting lines defined by points $AC_{j-1}$, $C_{j-1}$, $G_{j-1}$, which in turn is equal to the angle between a pair of intersecting lines defined by points $AC_j$, $C_j$, $G_j$, which in turn is equal to the angle $\phi$ plus $\pi/2$. In addition, the radius of the flight path of the center CENT of air gap ENT of transducer TMI can be represented as $R = AC_j$, in turn equal to $AC_{j-1}$; further, OA, the distance between the center of rotation of actuator ARCO and the center O of disc DISC is equal to D. From the foregoing, the following analysis can be made:

Angle $A_j = (AC_j, AC_{j-1})$
Angle $B_j = (OC_j, OC_{j-1})$
Angle $E_j = (C_jO, TR_{ijk})$
Angle $E_{j-1} = (C_{j-1}O, TR_{i(j-1)k})$
Distance $d_j = F_j G_{j-1}$ $$\text{Distance } r_{jmoy} = \frac{r_j + r_{j-1}}{2} = OF_j = OG_{j-1} \tag{1}$$

Since angle $\Delta\theta_j$ is very small:

$$\Delta\theta_j \simeq tg(\Delta\theta_j) \simeq \frac{d_j}{r_{jmoy}} \tag{2}$$

therefore $d_j = IH + IF_j + HG_{j-1}$.

Since triangles OIH, $C_{j-1}$, and $F_j C_j I$ are assimilated to right angle triangles:
$IH = r_{jmoy} \sin|B_{-J}|$
$IF = (P'/2)tg\ E_j$
$HG_{j-1} = (P'/2)tg\ E_{j-1}$
Therefore:

$$d_j = r_{jmoy} \sin|B_j| + (P'/2)tg\ E_j + (P'/2)tg\ E_{j-1} \tag{3}$$

If triangles $AOC_{j-1}$ and $AOC_k$ are considered (FIG. 11b), then $(AO, AC_j) = \delta_j$.
$(AO, AC_{j-1}) = \delta_{j-1}$
$(OC_j, OA) = \gamma_j$
$(OC_{J-1}, OA) = \gamma_{j-1}$
$(C_jA, C_jO) = \xi_j$
$(C_{j-1}, C_{j-1}O) = \xi_{j-1}$
It can be validly assumed that:

$$\begin{cases} A_j = \delta_{j-1} - \delta_j \geq 0 \text{ regardless of the value of } j; \\ B_j = \delta_j - \delta_{j-1} \leq 0 \text{ regardless of the value of } j. \end{cases}$$

Given (triangles $AC_jO$, $AC_{j-1}O$):
$\pi = \delta_{j-1} + \xi_{j-1} + \gamma_{j-1}$
$\pi = \delta_j + \xi_j + \gamma_j$
or: $\pi = \delta_{j-1} + \gamma - E_{j-1} + \gamma_{j-1}$
$\pi = \delta_j + \alpha - E_j + \gamma_j$,
from which:
$E_j = E_{j-1} + (\delta_j - \delta_{j-1}) + (\gamma_j - \gamma_{j-1})$
resulting in:

$$E_j = E_{j-1} - A_j + B_j \tag{4}$$

The trigonometric relationships in triangles $AC_jO$, $AC_{j-1}O$ result in the following (FIG. 11b):

$$A_j = \delta_{j-1} - \delta_j = \text{Arc } \cos\left(\frac{R^2 + D^2 - r_{j-1}^2}{2RD}\right) - \text{Arc } \cos\left(\frac{R^2 + D^2 - r_j^2}{2RD}\right) \tag{5}$$

$$B_j = \gamma_j - \gamma_{j-1} = \text{Arc } \cos\left(\frac{r_j^2 + D^2 - R^2}{2Dr_j}\right) - \text{Arc } \cos\left(\frac{r_{j-1}^2 + D^2 - R^2}{2r_{j-1}D}\right) \tag{6}$$

For transition $TR_{i0k}$, the following may be calculated:

$E_O = \phi + \eta/2 - \zeta_O$ where $\zeta_O =$ $$(C_OA, C_OO) = \text{arc } \cos\left(\frac{r_e^2 + R^2 - D^2}{2r_eR}\right)$$

(see FIG. 11c).
If $E_0 = E_{j-1}$ for transition $TR_{i0k}$, all of the values for $e_{j-1}$ and $E_j$ can be calculated step by step from relationships (4), (5), (6). Consequently, for a given value of the radius $r_{jmoy}$ between disc center O and point $G_{j-1}$, it is possible to compute all values for $d_j$, from which follow the values of $\Delta\theta_j$ and $\theta_j$.

All of the above indicated factors involved in calculating $\theta_j$ are found in the algorithm of FIG. 12 for calculating angles $\Delta\theta_j$. The data for performing the calculation are the number of zones N P', the writing pitch P' (which in the given example is equal to the pitch of the reference zones), the distance D, the radius R of path TV, the outside radius $r_e$ and the angle $\phi$.

The calculation algorithm comprises six major successive parts viz:

1. Initialize the calculation for writing the position of transition $TR_{iok}$, where j =0 (FIG. 11c), the angle $E_O=(C_oA, C_oO)$ is equal to $E_{j-1}$, which, in the calculation sequence, allows determination of all of the values of $E_j$ from $E_o$;

2. determine whether j is equal to NP'−1 (which corresponds to the innermost reference zone); j = NP'−1, the calculation is complete; if not, the algorithm proceeds to step 3;

3. increment j by one to j+1, that is, j is assigned a new value equal to the previous value of j plus 1;

4. assign a new value to $r_j$ such that $r_j=r_e-j\times P'$, and compute the values of $B_j$, $A_j$, $E_j$, $r_{jmoy}$, $d_j$, $\Delta\theta_j$ from Equations (6), (5), (4), (1), (3), (2) provided above;

5. calculate $$\theta_j = \overset{j}{\underset{}{\Sigma}} \Delta\theta_j;$$

6. assign the preceding values for $r_j$ and $E_j$ used in step 4 to $r_{j-1}$ and $E_{j-1}$; then repeat step 2 until the calculation is complete, as occurs when j=NP'−1.

From FIGS. 11 and 12 and Equations (1) to (6) and step 1 of the algorithm, angle $\theta_j$ is a function of the radius $r_j$ of the track where the transition is written and the value of $\theta_j$ is a function of the geometric parameters (R, $r_e$,$\phi$, D) of the write system.

It is possible from FIG. 9 to deduce curve $CI_{ik}$ for each transition $TR_{ijk}$ from path TV by a geometric transformation wherein center O of radius $r_j$ is rotated through an angle $\theta_j$ (accurate to a multiple of 2 $\pi$). Each transition in the transformation is a function of the position of the disc track where the transition i written and the geometric parameters of the write system.

Figure 13:
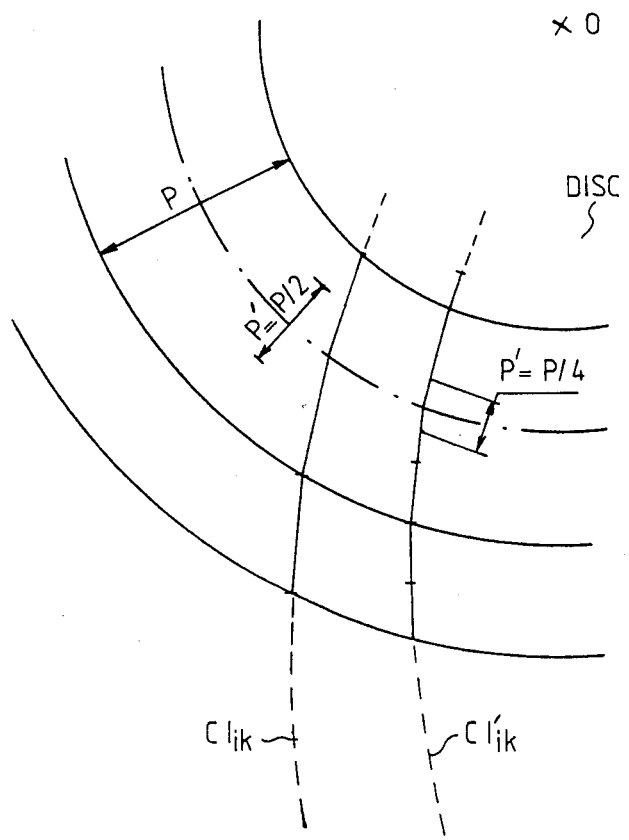
FIG. 13 is a schematic illustration of two exemplary embodiments of transition alignment curves for the same serial number of reference zones of one sector, wherein the alignment curves have two different writing pitches.

In FIG. 13, two transition alignment curves $CI_{ik}$ and $CI'_{ik}$ are written with different writing pitches (P'). Curves $CI_{ik}$ and $CI'_{ik}$ are respectively obtained by using writing pitches P' and P/4, in turn respectively substantially equal to P/2 and P/8.

Figure 14:
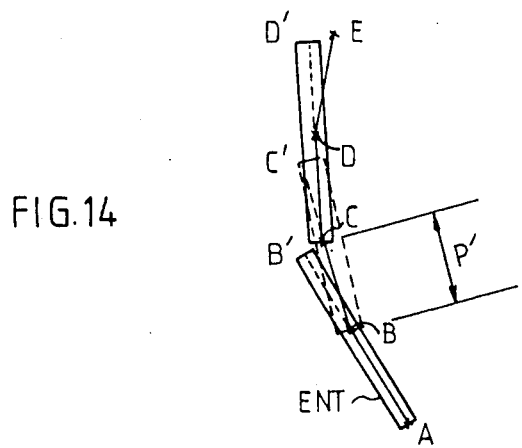
FIG. 14 is a schematic view of the method of writing transitions having the same serial number in reference zones of one sector, wherein there is a relatively small writing pitch.

To write all of the segments of curves $CI_{ik}$ and $CI'_{ik}$, the procedure indicated in FIG. 14 is followed; the dimensions and displacement between successive transitions are deliberately exaggerated to provide a better understanding of the Figure. When air gap ENT is centered above point B, transition AB' is written. The first and second parts of transition AB are respectively shown in solid and dashed lines for reasons explained below.

Transducer TMI is then moved through a distance corresponding to pitch P' in such a way that the air gap center is at point C. In this way, transition BC', formed of solid line segments BC and dashed line CC', is written. While transducer TMI writes transition BC' at this position, it erases transition segment BB'. Subsequently, transducer TMI is again moved a distance corresponding to pitch P' in such a way that the transducer air gap is centered at point D. Transducer TMI then writes transition CD' and erases transition segment BC'. In this manner, air gap ENT of transducer TMI is successively moved through distances equal to pitch P' so that successive abutting segments, AD, DC, CD, DE, etc., are written; each of segments AB, BC, CD, DE, etc., has a length substantially equal to P'. If P'=P/2, the number of transitions $TR_{ijk}$ written on the disc equals 2NP' (with two transitions per reference zone), where j is each value from 0 to 2NP'−1. Similarly, if P'=P/4, the number of transitions $TR_{ijk}$ written on the disc equals 4NP' (with four transitions per reference zone), where j is each value from 0 to 4NP'−1. More generally, if P'=P/m, the number of written transitions $TR_{ijk}$ equals mxNP' (with m transitions per reference zones), where j is each value from 0 to mxNP'−1.

Under these conditions, the method of calculating $\theta_j$ indicated in FIGS. 11 and 12 remains valid, but NP' no longer represents the number of zones; instead NP' represents the number of transitions to be written and aligned. While the invention is applicable to aligning transitions having the same serial number in all of the reference zones of one sector, it is more generally directed to aligning transitions of the same serial number in a group of adjacent tracks, wherein a track is defined as the geometric area of transitions located at the same distance ($r_j$) from center 0 of the disc. It is clear that, in this case, the reasoning set forth above in reference to FIGS. 9 to 14 remains fully valid by substituting the word "track" for the words "reference zone". The $CI_{ik}$ curves formed of a sequence of discrete units are defined to an accuracy which increases as P' decreases.

To write each of the $TR_{ijk}$ transitions of all of the reference zones of all of the sectors of a disc (DISC), it is merely necessary to know the values of $\theta_j$ and $\theta_{ijk}$. Thus, the phase of each transition is known. By extension, a determination is made of the interval between the time the angular reference indicator passes in front of transducer TMI (which defines the time and phase origin) and the instant when transition $TR_{ijk}$ is written, so that the phase of transition $TR_{ijk}$ equals $\theta_{ijk}+\theta_j$. Thus, it is sufficient to record in a memory table all of the phases of the $TR_{ijk}$ transitions of all of the reference zones of all of the $S_i$ sectors of disc DISC, and to adjust the electronic data write (or read) circuits in such a way that these transitions are written in the corresponding phase.

While the invention has been described in connection with a magnetic disc, it is applicable to any data recording medium, such as optical discs.

One of the advantages of the invention is that curve $CI_{00}$, contained in sector $S_0$, may be obtained from among all of the $CI_{ik}$ curves of the reference zone transitions. Phase $\theta'_j$ of each of transitions $TR_{0j0}$ of curve $CI_{00}$ equals $\theta_j$, with $\theta_{ijk}=0$. The phase difference of transition $TR_{ijk}$ of reference zone $ZRP_{ij}$ relative to transition $TR_{0j0}$ of reference zone $ZRP_{0j}$ equals $\theta'_j-\theta_j=\theta_{ijk}$. In consequence, as soon as the write operations of all of layers $CI_{ik}$ of all of the transitions of all of the reference zones are complete, for read operations, each $TR_{0j0}$ transition of curve $CI_{00}$ may be used as a transition which acts as an indicator index (called indicator index for short) for all of the transitions of zones $ZRP_{ij}$ located at distance $r_j$ from the center of the disc; the phase of each transition $TR_{ijk}$ of these zones relative to the indicator index transition equals $\theta_{ijk}$. Thus, the same read circuits may be employed as those used in disc memories having linear actuators employing a writing method wherein transitions of the same serial number of all of the reference zones have a constant phase.

While there have been described and illustrated several specific embodiments of the invention, it will be clear that variations in the details of the embodiments specifically illustrated and described may be made without departing from the true spirit and scope of the invention as defined in the appended claims.

We claim:

1. A method of writing data on a recording medium, wherein the data are written on a plurality of tracks by a write system including a transducer and an actuator which moves the transducer to a position facing the medium along a first given curve, the data being defined by at least one transition between two physical states of two elementary adjacent areas of the medium, said medium including a reference indicator relative to which each transition is defined by a predetermined phase, wherein at least part of the transitions along a second, predetermined curve are aligned, the method comprising:

(a) writing a reference transition on a given track with a reference phase;

(b) writing each transition of the second curve with a reference phase which is a function of the position of the track where the transition is written on the medium and of geometric parameters of the write system formed of the actuator, the transducer and the medium.

2. The method of claim 1 wherein the medium is a disc, and each written transition has a phase shift that is a function of the radius of the track where the transducer writes said transition, the value of the phase shift being a function of the angle between the transducer and the tangent to a travel curve where the transducer is located.

3. The method of claim 2 wherein the disc and the transducer are magnetic and the transducer includes an air gap, the phase shift being a function of the angle between the direction of the air gap and the tangent to the travel curve where the center of the transducer air gap is located.

4. The method of claim 3 wherein the actuator turns about an axis A and carries the transducer so the transducer is displaced from the axis by a radius R, turning the actuator about axis A so the first curve through which the transducer moves is an arc having radius R about center A, the phase shift being a function of radius R, distance D between the disc center and axis A, and a radius on the disc of the track where the reference transition is located.

5. The method of claim 4 wherein the phase shift is a function of a writing pitch of the transitions.

6. The method of claim 2 wherein the actuator turns about an axis A and carries the transducer so the transducer is displaced from the axis by a radius R, turning the actuator about axis A so the first curve through which the transducer moves is an arc having radius R about center A, the phase shift being a function of radius R, distance D between the disc center and axis A, and a radius on the disc of the track where the reference transition is located.

7. The method of claim 6 wherein the phase shift is a function of a writing pitch of the transitions.

8. The method of claim 3 wherein the phase shift is a function of a writing pitch of the transitions.

9. The method of claim 2 wherein the phase shift is a function of a writing pitch of the transitions.

10. A data containing disc adapted to be read with a transducer mounted on an arm at a radius R relative to an axis A about which the arm turns, axis A being located beyond the disc periphery, comprising a medium having concentric data tracks centered about a turning axis of the disc, data being represented on the medium as bilevel state changes along the length of the tracks, one of the tracks at radius $r_e$ from the disc center including a reference transition having a reference phase, the remaining tracks including transitions having the same serial number nominally associated with like data positions, the transitions having the same serial number being located along an arcuate curve extending in a generally radial direction of the disc such that the positions of the transitions having the same serial number are a function of the radius of the track from the disc center, the length of radii R and $r_e$, and the angle between a tangent of the path of the transducer across the concentric disc tracks and a center line along the length of the transducer.

11. The disc of claim 10 wherein the center line along the length of transducer is at right angles to the track including the reference transition when the transducer is positioned over the track including the reference transitions, the track including the reference transition being farther from the disc center than any of the other data tracks.

12. The disc of claim 11 further including a timing track concentric with the data tracks.

13. The disc of claim 10 wherein the positions of the transitions having the same serial number are a function of the radial spacing of adjacent tracks relative to the disc center.

14. The disc of claim 10 wherein the medium is magnetic, and each transition is a change in magnetic flux polarity.

15. In combination, a disc including a medium having concentric data tracks centered about a turning axis of the disc, data being represented on the medium as bilevel state changes along the lengths of the tracks, means for reading the data from and writing the data into the data tracks, the reading and writing means including: a transducer mounted on an arm at a radius R relative to an axis A about which the arm turns so as to read data from and write data into the tracks, axis A being located beyond the disc periphery, one of the tracks at radius $r_e$ from the disc center including a reference transition having a reference phase, the remaining tracks including transitions having the same serial number nominally associated with like data positions, the transitions having the same serial number being located along an arcuate curve extending in a generally radial direction of the disc such that the positions of the transitions having the same serial number are a function of the radius of the track from the disc center, the length of radii R and $r_e$, and the angle between a tangent of the path of the transducer across the concentric disc tracks and a center line along the length of the transducer.

16. The combination of claim 15 wherein the center line along the length of transducer is at right angles to the track including the reference transition when the transducer is positioned over the track including the reference transitions.

17. The combination of claim 16 wherein the track including the reference transition is farther from the disc center than any of the other data tracks.

18. The combination of claim 15 wherein the positions of the transitions having the same serial number are a function of the radial spacing of adjacent tracks relative to the disc center.

19. The combination of claim 15 wherein the medium is magnetic, and each transition is a change in magnetic flux polarity and the transducer is a magnetic transducer for sensing magnetic flux polarity transitions.

20. The combination of claim 15 further including a timing track concentric with the data tracks.

* * * * *